United States Patent
Lee

(10) Patent No.: US 7,423,808 B2
(45) Date of Patent: Sep. 9, 2008

(54) REAR PROJECTION SCREEN WITH SPATIAL VARYING DIFFUSING ANGLE

(75) Inventor: Wai-Hon Lee, Los Altos, CA (US)

(73) Assignee: K Laser Technology, Inc., Hsin-Chu (TW)

(*) Notice: Subject to any disclaimer, the term of this patent is extended or adjusted under 35 U.S.C. 154(b) by 0 days.

(21) Appl. No.: 11/685,080

(22) Filed: Mar. 12, 2007

(65) Prior Publication Data
US 2007/0153378 A1 Jul. 5, 2007

Related U.S. Application Data

(62) Division of application No. 11/059,160, filed on Feb. 15, 2005, now abandoned.

(51) Int. Cl.
G03B 21/60 (2006.01)
G03H 1/16 (2006.01)
G02B 27/46 (2006.01)
G02F 1/135 (2006.01)

(52) U.S. Cl. ............ 359/457; 359/29; 359/559; 359/460; 349/30

(58) Field of Classification Search ............ 359/457, 359/29, 559, 443, 454, 460; 349/30
See application file for complete search history.

(56) References Cited

U.S. PATENT DOCUMENTS 4,701,020 A 10/1987 Bradley, Jr.
6,848,795 B2 2/2005 Kaminsky et al.
6,896,375 B2 5/2005 Peterson et al.
2002/0037703 A1 3/2002 Hirota et al.
2004/0012833 A1* 1/2004 Newswanger et al. ......... 359/35
2004/0233526 A1 11/2004 Kaminsky et al.
2004/0240015 A1* 12/2004 Newswanger et al. ......... 359/35

FOREIGN PATENT DOCUMENTS

JP 07181598 A 3/1993

OTHER PUBLICATIONS

Haruna, Masamitsu et al.; "Laser beam lithographed micro-Fresnel lenses"; 1990, *Applied Optics*, vol. 29, No. 34, pp. 5121-5126.

* cited by examiner

*Primary Examiner*—Diane I. Lee
*Assistant Examiner*—Magda Cruz
(74) *Attorney, Agent, or Firm*—Townsend and Townsend and Crew, LLP

(57) ABSTRACT

A Fresnel lens of the prior art is split into two Fresnel lenses to allow easier control of the horizontal and vertical viewing angles. In a second embodiment, the Fresnel lens is entirely eliminated. Instead, the diffuser contains elliptical microstructures so that the diffusing cones in orthogonal directions are different, eliminating the need for a Fresnel lens to perform this function. To compensate for the absence of the light collimation provided by the Fresnel lens, a diffuser with spatially varying diffusing angles is used.

7 Claims, 11 Drawing Sheets

REAR PROJECTION SCREEN WITH SPATIAL VARYING DIFFUSING ANGLE

CROSS-REFERENCES TO RELATED APPLICATIONS

This application is a division of U.S. application Ser. No. 11//059,160, filed Feb. 15, 2005 entitled "Rear Projection Screed With Spatial Varying Diffusing Angle," which application is incorporated herein by reference.

STATEMENT AS TO RIGHTS TO INVENTIONS MADE UNDER FEDERALLY SPONSORED RESEARCH OR DEVELOPMENT

Not Applicable

REFERENCE TO A "SEQUENCE LISTING," A TABLE, OR A COMPUTER PROGRAM LISTING APPENDIX SUBMITTED ON A COMPACT DISK

Not Applicable

BACKGROUND OF THE INVENTION

The present invention relates to rear projection screens for slide or movie projectors, and in particular to an improved Fresnel lens and diffuser system for such projectors.

Images on photographic films can be projected on a screen with devices such as slide projectors or movie projectors. Electronic images can also be projected on screens through the use of high power cathode ray tubes. This is the principle used in most projection televisions sold today. More recently, with the advancement of liquid crystal displays (LCD), compact projectors have been developed and have led to a new generation of low cost and high performance projection televisions. As a result, there is an increasing demand for low cost rear projection screens. The common characteristics of such viewing screens are high light efficiency, wide viewing angle and uniform brightness.

There is a tradeoff between wider viewing angles and brightness of the image at any viewing angle. In particular, it is desirable to have a wide viewing angle in the horizontal direction so that people can be seated on either side. However, since most people's eyes are at similar levels vertically, it is desirable to have a narrower viewing angle vertically to preserve the brightness of the image.

FIG. 1 illustrates the principle of an image projection system 100. An image projector 101 projects images on a rear projection screen 102. The light coming out from the projector subtends an angle 103 and angle 104 depicts the diffusing angle of the screen. The angle 104 also defines the angle from which a viewer can see the images on the screen.

FIG. 2 illustrates a basic structure of a rear projection screen 200. Element 202 is a field lens. Its function is to collimate the diverging cone of light 203 into a parallel beam of light. Element 202 can be a glass lens. But, more commonly, it is a plastic Fresnel lens. Element 205 is a diffuser which causes the incident light falling on its surface to spread over an angular cone. Angle 204 depicts the diffusing angle on the plane of the paper and angle 206 depicts the diffusing angle on a plane out of the paper.

FIG. 3 shows a rear projection screen according to U.S. Pat. No. 4,773,731. In this prior art, the Fresnel lenses are recorded on both surfaces of a first element 302. Element 302 is bonded to a second element 320 which contains scattering particles 318 and surface structure 322 to increase the viewing angle. The refractive index of 302 is different from the refractive index of 320.

FIG. 4 shows another construction of the field lens according to U.S. Pat. No. 6,046,847. The alternating zones of the Fresnel lens have different focal lengths f1 and f2. As a result, the light beam from the projector can be made parallel in one direction and converging in a direction orthogonal to the first direction.

FIG. 5 shows another embodiment of rear projection screen where special structures and Fresnel lens are molded into a single plastic element (U.S. Pat. No. 6,304,378).

FIG. 6 shows a diffusing element consisting of microlenses and light blocking elements according to U.S. Pat. No. 5,870,224. The light blocking elements enhance the contrast in the projected image. A Fresnel lens is made by first mechanically cutting circular grooves with different slopes on a metal blank. After machining, this blank is used in a plastic injection molding equipment to replicate the structure onto a plastic sheet. The depth of the grooves in a mechanically engraved Fresnel lens is typically more than 100 µm and is not suitable for use in surface embossing equipment.

BRIEF SUMMARY OF THE INVENTION

The present invention provides methods and apparatus for improving the manufacturability of a Fresnel lens and diffuser system for a projector, and for enabling finer control of viewing angles.

In a first embodiment of the present invention, the Fresnel lens of the prior art is split into two Fresnel lenses. This allows easier control of the viewing angle in horizontal and vertical directions by physically separating, and manufacturing separately, the lens structure for each.

Additionally, separating the Fresnel lens into two lenses eliminates the circular structure of the single lens of the prior art. In particular, the field lens of the invention consists of two orthogonal cylindrical Fresnel lenses and a diffuser. The focal length of each cylindrical lens can be selected independently. In addition, the two structures can be thinner in combination than the single structure of the prior art, further improving manufacturability.

In a second embodiment of the invention, the Fresnel lens is entirely eliminated. Instead, the rear projection screen contains only the diffusing element. The diffuser contains elliptical microstructures so that the diffusing cones in orthogonal directions are different, eliminating the need for a Fresnel lens to perform this function. To compensate for the absence of the light collimation provided by the Fresnel lens, a diffuser with spatially varying diffusing angles is used.

The present invention also sets forth methods for producing the cylindrical Fresnel lens of the first embodiment and the diffusing element with elliptical microstructures and spatially varying diffusing angles of the second embodiment.

DETAILED DESCRIPTION OF THE INVENTION

Figure 1:
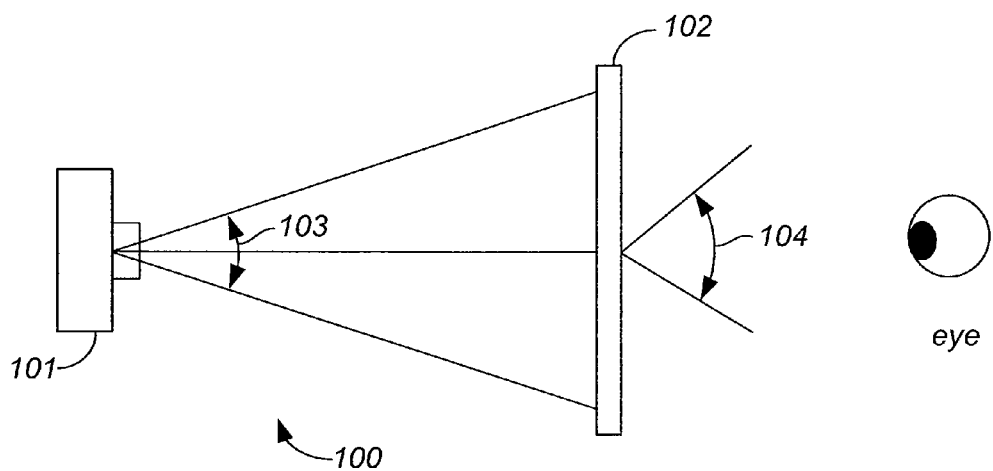
FIG. 1 is a diagram of a prior art rear projection system.
Figure 2:
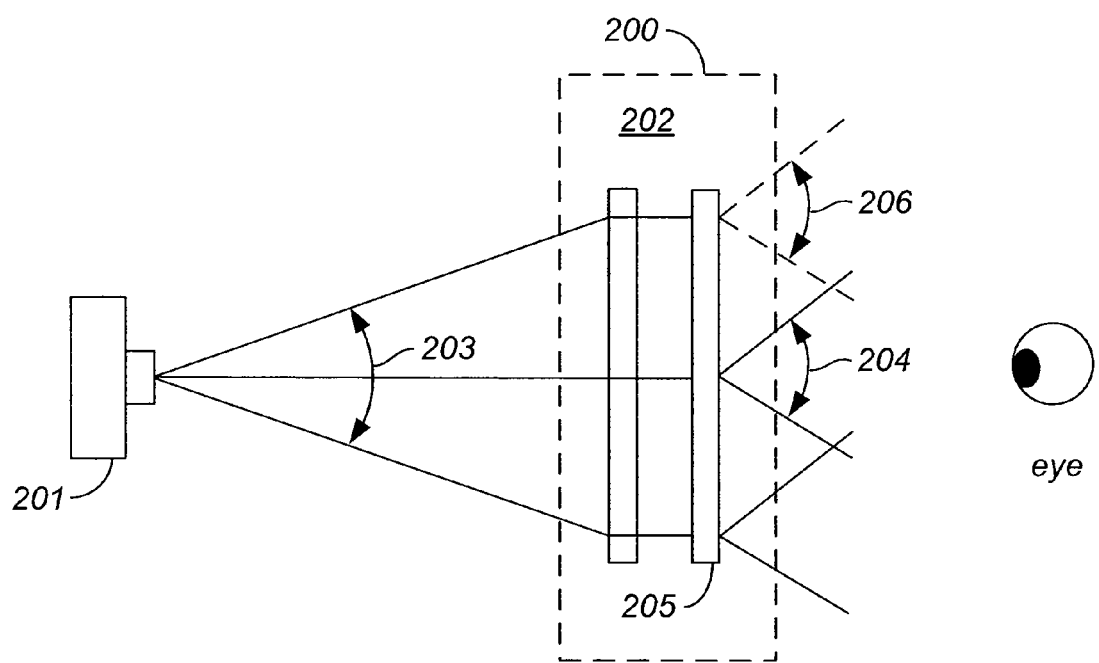
FIG. 2 is a diagram of the structure of a prior art rear projection screen.
Figure 3:
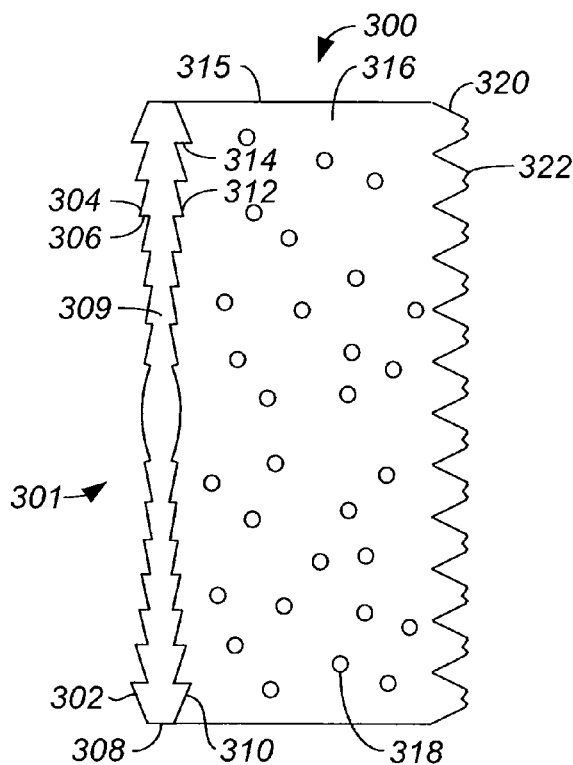
FIG. 3 is a cross-sectional diagram of a prior art rear projection screen according to U.S. Pat. No. 4,773,731.
Figure 4:
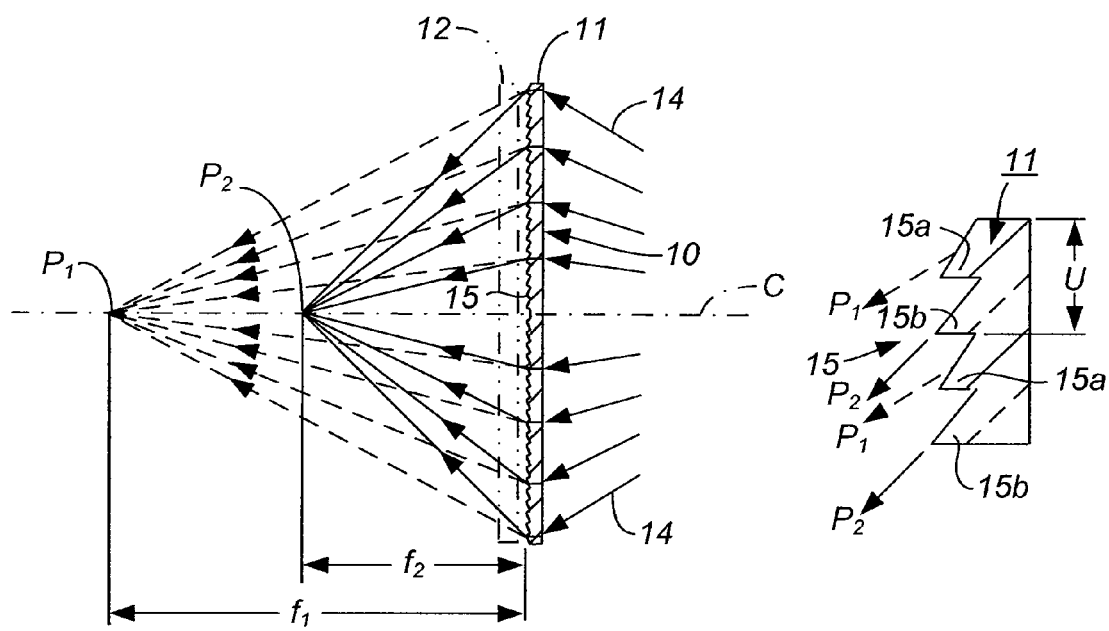
FIG. 4 is a cross-sectional diagram of a prior art rear projection screen according to U.S. Pat. No. 6,046,847.
Figure 5:
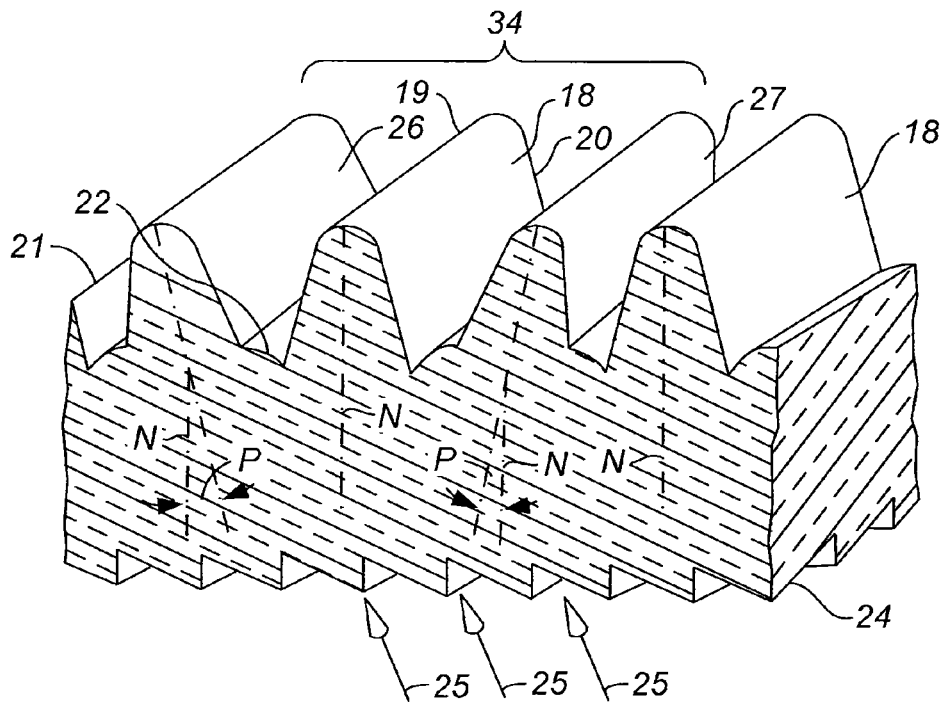
FIG. 5 is a cross-sectional diagram of a prior art rear projection screen according to U.S. Pat. No. 6,304,378.
Figure 6:
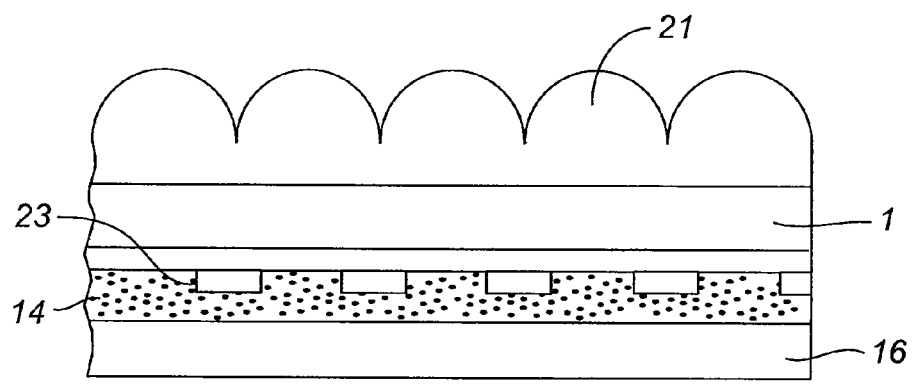
FIG. 6 is a cross-sectional diagram of a prior art rear projection screen according to U.S. Pat. No. 5,870,224.
Figure 7:
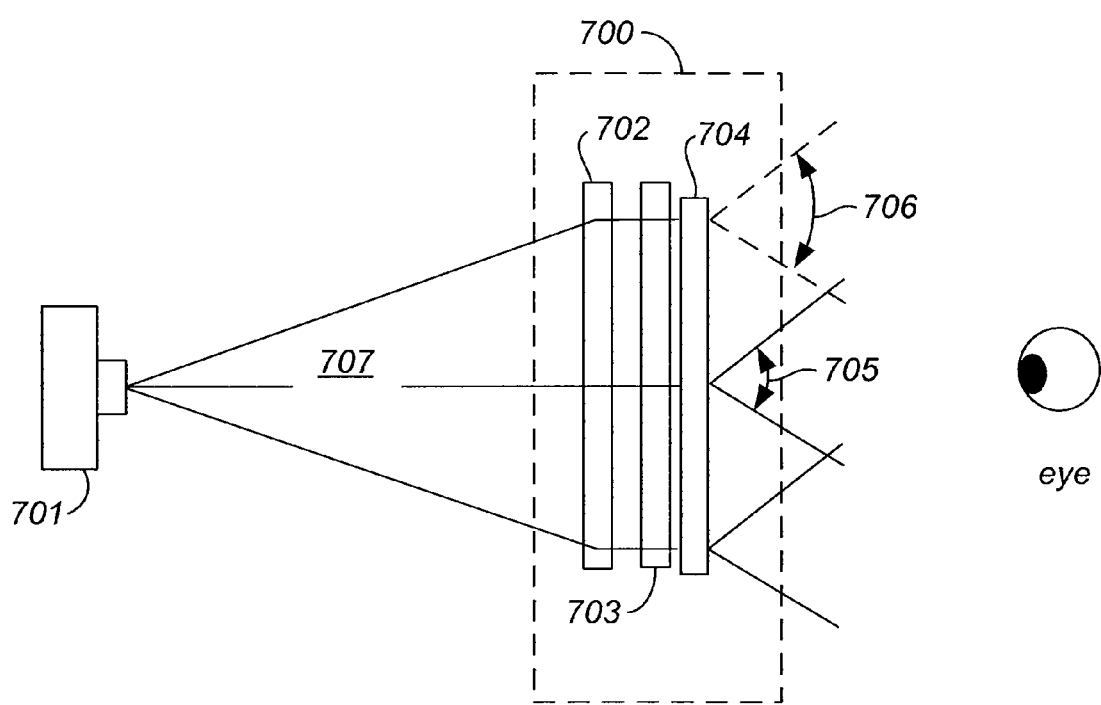
FIG. 7 is a cross-sectional diagram of a rear projection screen system according to the present invention.
Figure 8A:
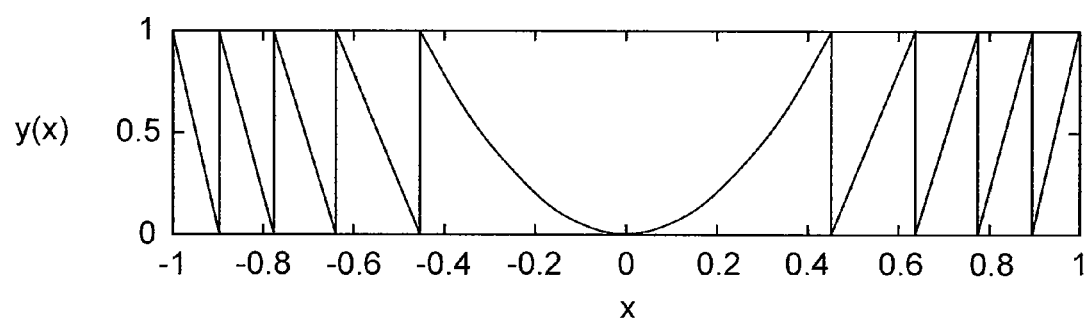
FIGS. 8(*a*) and (*b*) are cross-sectional views of negative and positive thin Fresnel lenses with a resulting fine spatial structure FIGS. 8(*c*) and (*d*) are cross-sectional views of negative and positive thick Fresnel lenses with a resulting coarse spatial structure.
Figure 8B:
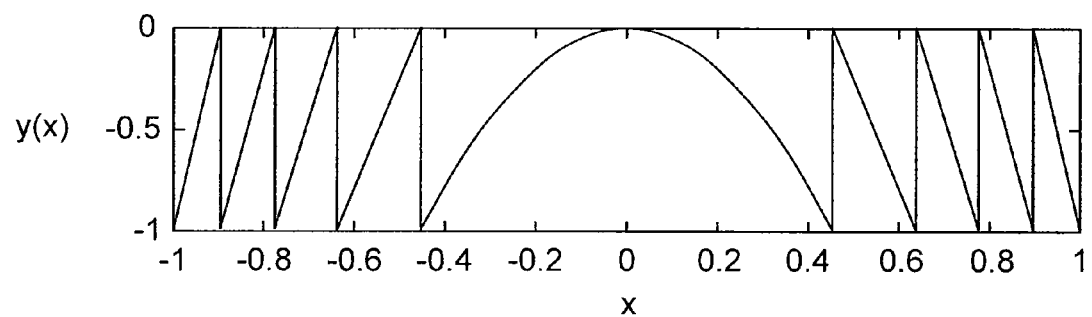
Figure 8C:
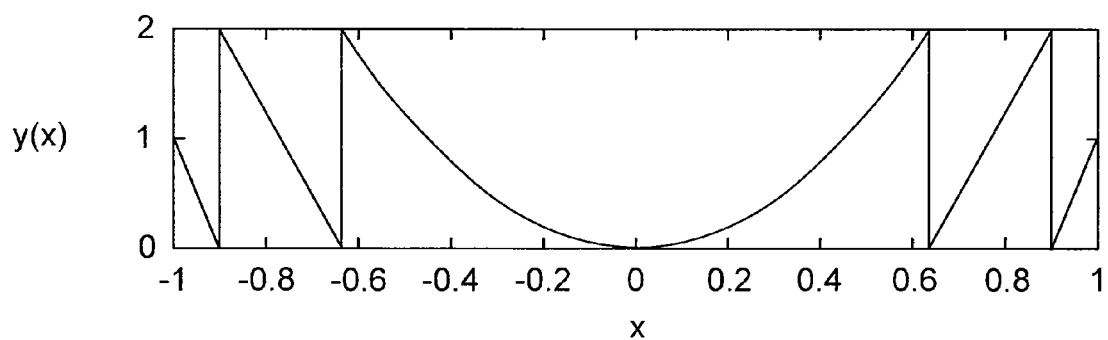
Figure 8D:
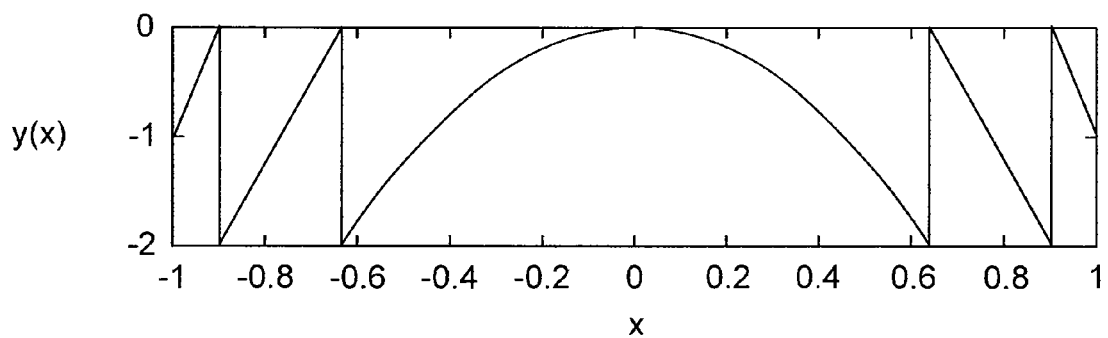

In FIG. 7, element 700 is the first embodiment of a rear projection screen of the present invention. An image projector 701 projects images on a rear projection screen 700, which consists of three planar optical elements 702, 703 and 704 laminated together. Element 704 is a diffuser that scatters incident light over an elliptical cone with angle 705 and 706. Angle 705 depicts the diffusing angle on the plane of the paper and angle 706 depicts the diffusing angle on a plane out of the paper. Optical elements 702 and 703 are cylindrical Fresnel lenses with surface structure as illustrated in FIGS. 8(*a*)-(*d*). Optical element 704 is a diffuser. The phase variation of a cylindrical lens is approximately given by $$\theta(x) = \frac{\pi x^2}{\lambda F} + \phi(x) \qquad (1)$$

where x is the spatial variable, λ is the wavelength of light, F is the focal length and ψ (x) is either phase aberration or phase correction. The phase of a Fresnel lens is determined by taking the modulo 2 mπ of the phase function ϑ(x) as shown below:

$$\vartheta_F(x) = \text{Mod}(\vartheta(x), 2m\pi), \qquad (2)$$

where Mod means modulo, and m is a non-zero integer. The thickness d(x) of a Fresnel lens having the same phase is given by $$\vartheta_F(x) = \frac{2\pi(n-1)d(x)}{\lambda}, \qquad (3)$$

where n is the refractive index of the substrate. Therefore, $$d(x) = \frac{\lambda}{2\pi(n-1)} \vartheta_F(x) = \left(\frac{\lambda}{(n-1)}\right) \text{Mod}\left[\left(\frac{\vartheta(x)}{2\pi}\right), m\right]. \qquad (4)$$

The structural depth of the Fresnel lens is $$\frac{m\lambda}{n-1}$$

with minimum structural depth of $$\frac{\lambda}{n-1}.$$

FIG. 8(*a*) and FIG. 8(*b*) show respectively the phase of a negative and a positive Fresnel lens m=1. FIG. 8(*c*) and FIG. 8(*d*) show respectively the phase of a negative and a positive Fresnel lens with m=2. As can be seen, when the structural depth increases, the spatial structure becomes coarser. Most of the Fresnel lenses made by injection molding have a structural depth of more than 100 µm. The spatial structure is sufficiently coarse so that the structure can be cut into a metal blank by mechanical means. In this present invention an optical method is used to produce a structural depth of less than 10 µm on a plate coated with photoresist.

Figure 9:
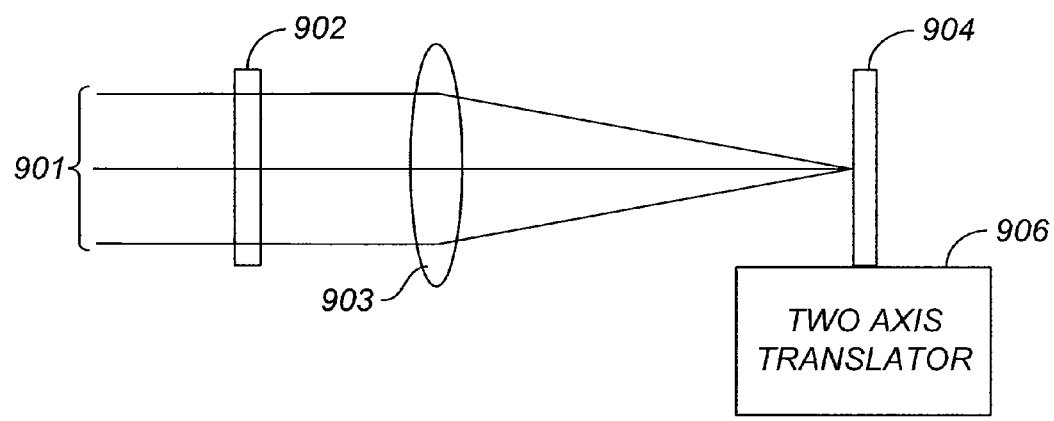
FIG. 9 is a diagram of a system for producing cylindrical Fresnel lenses.

One embodiment of an optical system for recording the Fresnel lens on a photoresist plate is shown in FIG. 9. Laser beam 901 is incident on a spatial light modulator 902. After passing through the spatial modulator 902, the laser beam is focused by lens 903 to a spot on the surface of a photoresist plate 904, which is mounted on a two axis translator stage 906. The spatial light modulator 901 controls the brightness and the shape of the spot in accordance to the function y(x). After the photoresist is exposed and developed, the surface profile thus recorded is identical to y(x). The surface relief pattern on the photoresist is then transferred to a nickel blank by electroplating. The nickel shim with the Fresnel lens pattern is then used as master to emboss the Fresnel lens structure on a substrate coated with UV curable polymer.

Figure 10:
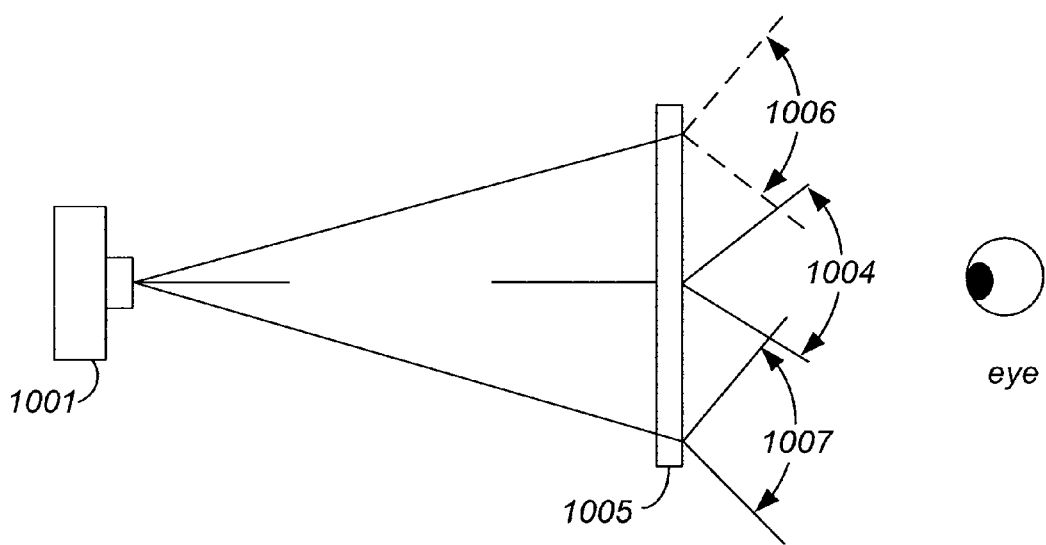
FIG. 10 is a diagram of a second embodiment of a rear projection system according to the present invention, eliminating the Fresnel lens with a spatially varying diffuser.

FIG. 10 shows the second embodiment of the rear projection screen 1005. Projector 1001 projects an image on a screen 1005. The light ray from the projector 1001 at any horizontal location x of the screen 1002 subtends an angle ω(x) with respect to the surface normal of the screen. We assume that the diffusing cone needed for the horizontal direction is equal to ±ω_d at the center location. In order for a viewer sitting at a position creating an angle of ω_d to see the image at location x, the diffusing cone at location x must equal to ±(ω_d+ω(x)). Since the angle of the projected rays increases as it deviates from the center of the screen, the diffusing cone 1004 in the center of the screen is smaller than the diffusing cone 1006 and 1007 at the edge of the screen.

Figure 11:
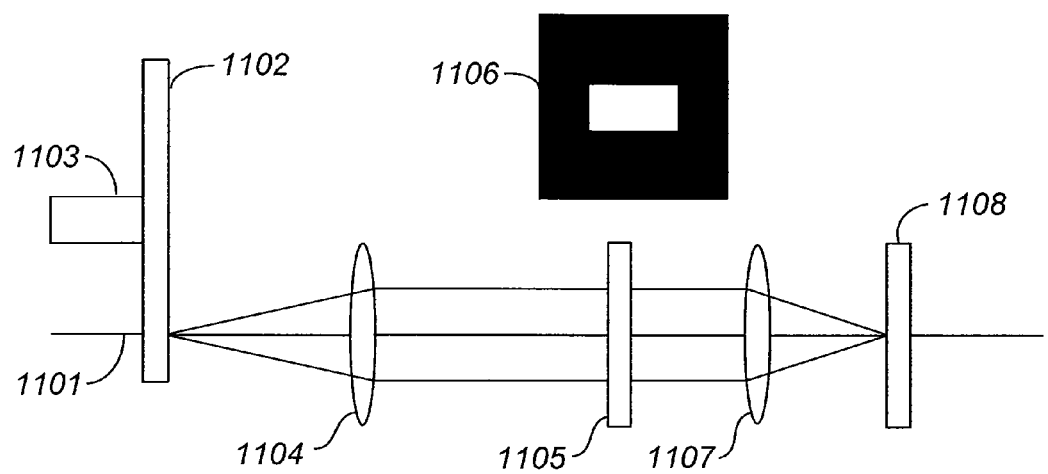
FIG. 11 is a diagram of a first system for producing the spatial varying diffuser of FIG. 10.

There are at least two methods for making such a spatial varying diffusing screen according to this present invention. A first method is illustrated in FIG. 11. A light diffusing element 1102 is mounted on a rotating shaft 1103. Light beam 1101 is incident on the diffusing element 1102. Lens 1004 produces a spectrum of the diffusing element on plane 1105 where spatial light modulator 1106 is located. The spatial light modulator has a rectangular opening to control the spectrum of the speckles recorded on the photoresist plate at plane 1108, which is also the image plane of the diffusing element 1102. An objective lens 1107 focuses the light on photoresist plate 1108.

Figure 12:
FIG. 12 is a diagram of a speckle pattern for a spatial varying diffuser with a 4:1 aspect ratio produced using the system of FIG. 11.

The diffusing angle of the speckles recorded is given by $$\sin \omega_d = \frac{W}{2F},$$

where W is the width of the rectangular aperture on the spatial light modulator. After recording one diffusing dot at location x, the translator moves the photoresist plate to a new location, x+δ. At the same time the diffusing element 1102 is now rotated to a new location to record the next diffusing dot on the photoresist plate. This process is repeated for both spatial directions until diffusing dots completely fill the photoresist plate. As the translator moves to a new location, a controller will input the appropriate aperture on the spatial modulator so that the new diffusing dot will have the required diffusing angle for that location. FIG. 12 shows a spatially varying diffuser with a simulated speckle pattern with aspect ratio of 4:1 produced according to this method of the present invention.

Figure 13:
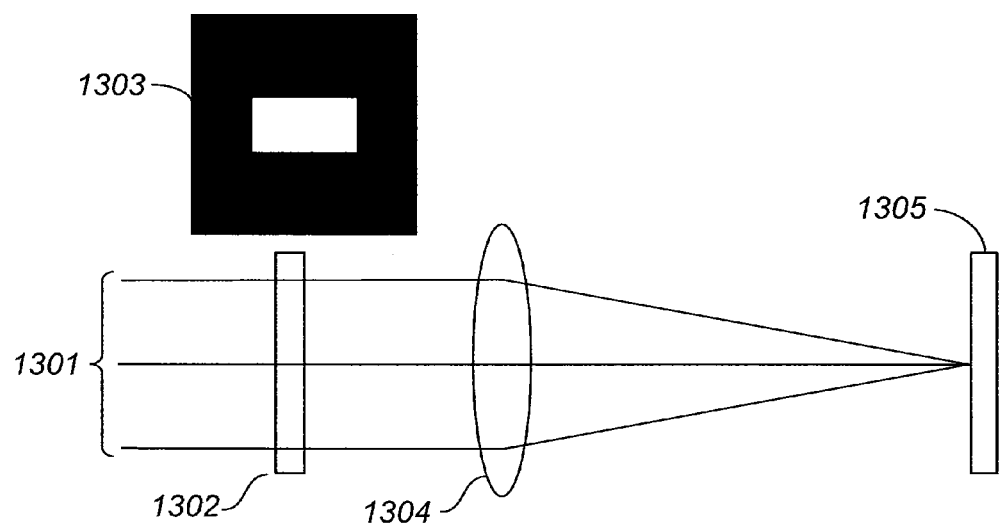
FIG. 13 is a diagram of a second system for producing the spatial varying diffuser of FIG. 10.

FIG. 13 shows a second method of this present invention for producing the diffusing element. A collimated beam 1301 illuminates a spatial modulator 1302 which has a rectangular opening as shown in the view 1303 of the spatial modulator. The pattern displayed by spatial modulator 1302 is a computer generated Fourier transform of a random phase pattern $$f(x,y) = e^{i2\pi g(x,y)}, \quad (4)$$

where g(x,y) is a random function with values between 0 and 1. F(u,v) is the Fourier transform of f(x,y):

$$F(u,v) = \int f(x,y) e^{i(ux+vy)} dx dy. \quad (5)$$

The pattern displayed on the spatial modulator is proportional to $$I(u,v) = |e^{i2\pi \bar{\omega} u} + F(u,v)|^2, \quad (6)$$

where $\bar{\omega}$ causes a shift in the speckle pattern away from the optical axis in the reconstruction process. Lens 1304 performs inverse Fourier transform and reproduces a speckle pattern on the recording plane 1305 similar to those shown in FIG. 12. The aspect ratio of the speckles is controlled by the width and height of the computer generated hologram as shown in 1303. As in the previous system, after recording one diffusing dot, the translator will move the recording plate to a new position and the pattern on the spatial light modulator is replaced by a computer generated hologram with a new random phase structure. This process is repeated until the recording plate is completely filled with diffusing dots. The advantage of this second system is that other than the translator there is no other mechanical motion in the recording system.

It will be understood that modifications and variations may be effected without departing from the scope of the novel concepts of the present invention. For example, other methods could be used to produce the split Fresnel lenses or spatially varying diffuser. Another method for producing a Fresnel lens that can be used to create the structure of the present invention is set forth in U.S. Pat. No. 4,737,447. Accordingly, the foregoing description is intended to be illustrative, but not limiting, of the scope of the invention which is set forth in the following claims.

What is claimed is:

1. A system for constructing a diffuser for a projection screen, comprising:
   a laser device for generating a laser beam:
   a rotating diffuser mounted to receive said laser beam;
   a first lens mounted to receive a diffused laser beam from said rotating diffuser;
   a spatial modulator mounted to receive a modified laser beam from said first lens;
   a second lens mounted to receive a spatially modulated laser beam from said spatial modulator;
   a two axis translator mounted after said second lens; and
   a light sensitive recording material mounted on a two axis translator;
   wherein said spatial modulator and said two axis translator are configured to operate to produce a spatial varying diffuser.

2. The system of claim 1 wherein said first lens produces a spatial spectrum of said diffuser.

3. The system of claim 1 wherein said spatial light modulator controls spectral region of the diffuser.

4. The system of claim 1 wherein said second lens images the diffuser to the recording surface.

5. A system for constructing a diffuser comprising:
   a laser device producing a laser beam:
   a spatial light modulator mounted to receive said laser beam;
   a lens mounted to receive a spatially modulated beam from said spatial light modulator;
   a two axis translator mounted after said lens; and
   a light sensitive recording material mounted on said two axis translator;
   wherein said spatial modulator and said two axis translator are configured to operate to produce a spatial varying diffuser.

6. The system of claim 5 wherein said lens performs a Fourier transform on the pattern displayed on said spatial light modulator.

7. The system of claim 5 wherein the pattern displayed on said spatial light modulator is the Fourier transform of a random phase function.

* * * * *